United States Patent [19]

Mazuir

[11] 4,114,190
[45] Sep. 12, 1978

[54] ELECTRONIC PROGRAMMER HAVING AUTOMATIC PROGRAM SELECTION

[75] Inventor: Maurice Mazuir, Cluses, France

[73] Assignee: Etablissements Carpano & Pons, France

[21] Appl. No.: 762,231

[22] Filed: Jan. 25, 1977

[30] Foreign Application Priority Data

Feb. 9, 1976 [FR] France .................. 76 03800

[51] Int. Cl.² .................. G06F 9/06; G06F 3/02
[52] U.S. Cl. .................. 364/900; 68/12 R; 134/57 D
[58] Field of Search ... 364/200 MS File, 900 MS File; 68/12 R; 134/57 R, 57 D, 58 R, 58 D

[56] References Cited

U.S. PATENT DOCUMENTS

| | | | |
|---|---|---|---|
| 3,533,076 | 10/1970 | Perkins | 364/200 |
| 3,911,424 | 10/1975 | Giannuzzi | 364/900 |
| 3,976,975 | 8/1976 | Cochran | 364/900 |
| 3,979,058 | 9/1976 | Katz | 364/900 |
| 4,001,599 | 1/1977 | Karklys | 134/57 D |

*Primary Examiner*—James D. Thomas
*Attorney, Agent, or Firm*—Robert E. Burns; Emmanuel J. Lobato; Bruce L. Adams

[57] ABSTRACT

A program selector of an electronic programmer, e.g. of a washing machine, in which programs are stored in an integrated circuit store or memory, comprises two manual control switches and two display devices. One switch cooperates with selection circuitry cooperating with a numeric display device to increment a displayed number corresponding to a program number when the first switch is closed or to hold a selected program number displayed when the first switch is open. The second switch enables starting of a stored program corresponding to a displayed program number, the phases of the program carried out being displayed by a symbolic display device.

4 Claims, 2 Drawing Figures

ELECTRONIC PROGRAMMER HAVING AUTOMATIC PROGRAM SELECTION

BACKGROUND OF THE INVENTION

The invention concerns electronic programmers comprising means for selecting any one of several programs stored in an electronic circuit including at least one integrated circuit having inputs and outputs some of which are connected to operational members of a machine, and display means connected to the integrated circuit.

A programmer of this type described in "Electronics" vol. 48 Oct. 2, 1975, No. 20, p. 6E comprises one push-button switching member or element and one visualiser or display per program, i.e. as many switching members and visualisers as then are programs to be selected. As each switching member must be connected to an input of the integrated circuit, it is necessary to have as many inputs as there are switching members. This necessitates a large number of connections and a complex cabling which may lead to connecting errors when cabling is carried out, or when a repair is made. Furthermore, as the number of inputs of an integrated circuit is limited, the possible number of connections is even more limited than in the earlier electronic programmers which did not include an integrated circuit. These earlier programmers, described for example in French Pat. No. 2,162,057, also have the drawbacks mentioned above.

SUMMARY OF THE INVENTION

An aim of the invention is to provide a programmer which does not involve the stated drawbacks, but with which it is possible to select any of a large number of programs, without it being necessary to use as many switching means and inputs as there are programs, and with which the cabling of the switching means is consequently simplified.

According to the invention a programmer of the above-mentioned type includes a first switching means for connecting a voltage source to at least one input of the integrated circuit, the display means being formed by a numeric or symbolic visualiser connected to outputs of the integrated circuit, said selection means being contained in the integrated circuit and cooperating with means for detecting a particular position of said first switching means, said selection means also cooperating with the display means to increment signs visualised by said display means as long as said first switching means occupies said position, and second switching means for actuating starting of a stored program corresponding to a visualised sign. The two switching means are for example manual switches.

The accompanying drawings show, by way of example, an embodiment of the programmer according to the invention. In the drawings.

DESCRIPTION OF THE EMBODIMENT

Figure 1:
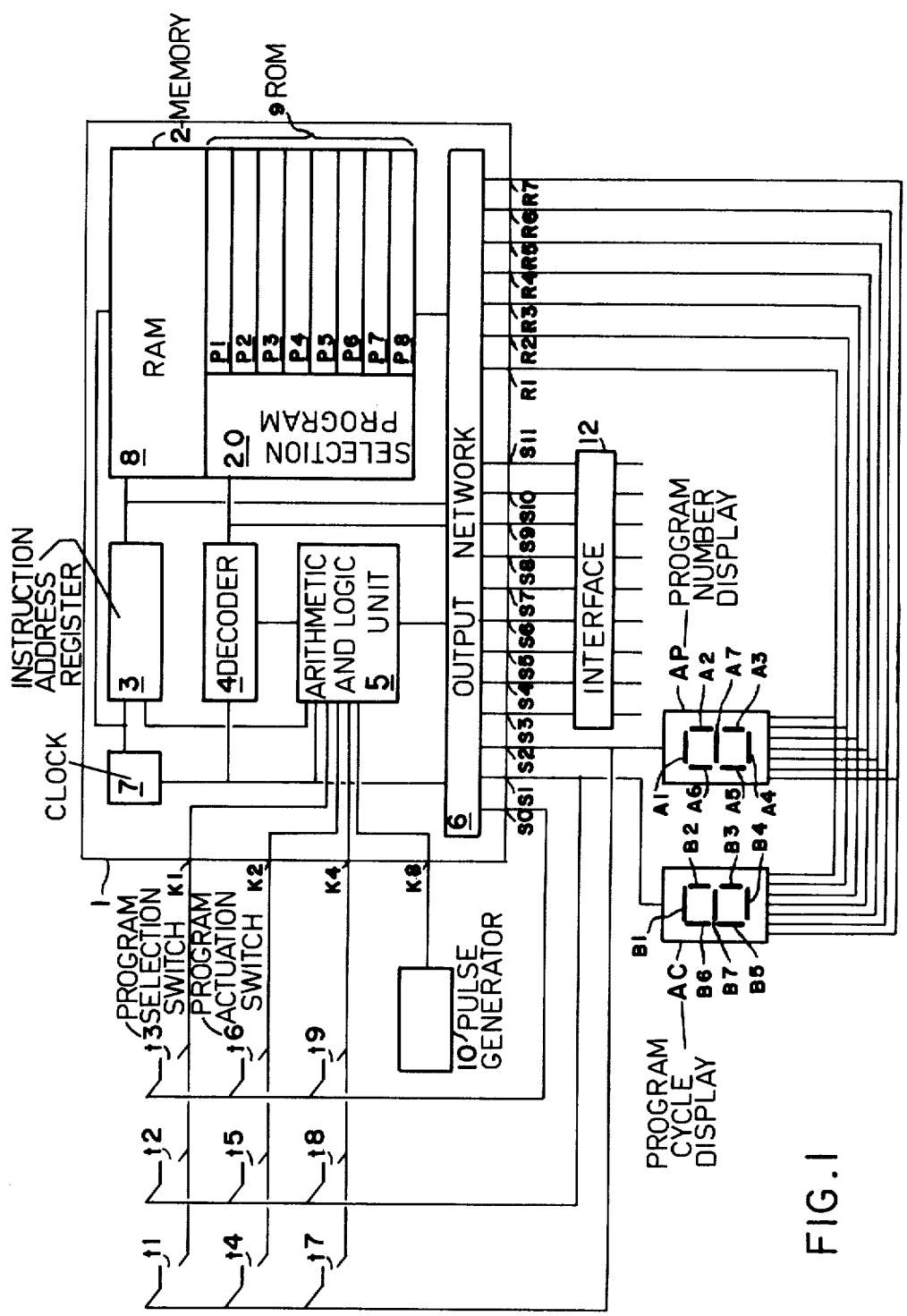
FIG. 1 is a schematic circuit diagram of the embodiment.

As shown in FIG. 1 the programmer includes an integrated circuit 1, for example the circuit TMS 1000 of Texas Instruments Incorporated, which has four inputs K1, K2, K4 and K8 and 19 outputs S0 to S11 and R1 to R7. The integrated circuit includes an instruction address register 3 connected to a memory 2 which contains a number of cells in which information may be read or stored. This information may be either a data to be manipulated by arithmetic or logic operations, or an instruction which dictates the operation to be carried out. This memory 2 has an RAM writing reader 8, for storing data temporarily, and an ROM part 9 which contains series of instructions corresponding to a selection program 20 and to programs to be selected P1 to P8. Each of these programs is composed of a certain number of steps. The different programs are, for example, written end-to-end: program P1, steps 1 to 23; program P2, steps 24 to 51, etc. Alternatively, the different programs may be only a part of a basic program, for example: program P1, steps 1 to 78; program P2, steps 12 to 78; program P3, steps 41 to 78, etc. One may also combine these two arrangements. The steps 0 and 99 of these programs correspond to rest positions.

Furthermore, in this integrated circuit 1, the instruction address register 3 is connected to an output network 6 and to an arithmetic and logic unit 5 able to carry out the operation requested by the instructions and to control the sequence of the different cycles required by these instructions. The arithmetic and logic unit 5 is also connected to the output network 6 and to an instruction-decoding register 4 which is itself connected to the memory 2 and to the output network 6. This output network 6 is connected to the outputs S0 to S11 and R1 to R7 of the integrated circuit and to the memory 2. A clock 7 is connected to the memory 2, to the instruction address register 3, to the instruction-decoding register 4, to the arithmetic and logic unit 5, and to the output network 6 to synchronise operation of these elements and the transmissions between them.

The output S0 is connected to switches $t3$, $t6$ and $t9$. The output S1 is connected to switches $t2$, $t5$ and $t8$ and to a seven-segment display device AC which indicates the carrying out of the different phases of the program. The output S2 is connected to switches $t1$, $t4$ and $t7$ and to a seven-segment display device AP which indicates the number of the programs. The outputs R1 to R7 are connected to the seven-segments A1 to A7 of the display device AP and to the seven segment B1 to B7 of the display device AC. The switches $t1$, $t2$, $t3$ are connected to the input K1, switches $t4$, $t5$, $t6$ to input K2, and switches $t7$, $t8$, $t9$ to input K4. The input K8 is connected to a pulse generator 10. The outputs S3 to S11 are connected, via a network of interfaces 12, to elements intended to be controlled by the various programs; pumps, valves, heating resistors and so forth. Switch $t3$ is a manually controlled switch for selection of the programs. Switch $t6$ is also a manually controlled switch, for starting or reading out the selected program.

Figure 2:
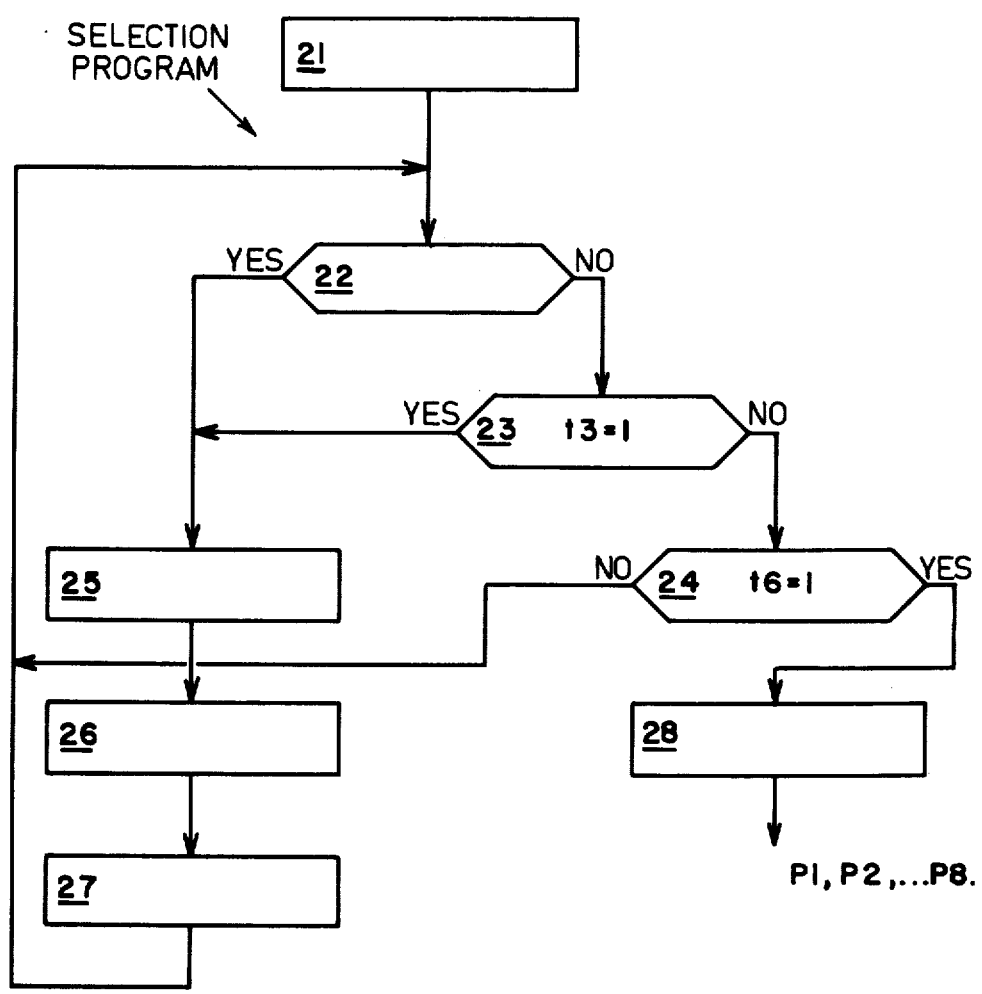
FIG. 2 is a block diagram of the selection program of the embodiment.

As schematically shown in FIG. 2, the selection program 20 includes several sub-programs 21 to 28. An initial sub-program 21 includes instructions the last of which precedes the first instruction of the sub-program 22 for testing the step 99. The last instruction of sub-program 22 is a conditional call instruction for the first instruction of sub-program 23 for testing the position of switch $t3$ or of the first instruction of sub-program 25, for incrementing and display of the number of the program. The sub-program 25 includes instructions the last of which precedes the first instruction of sub-program 26 for zero-setting the number of the step. The last instruction of sub-program 26 precedes the first instruction of sub-program 27 for delaying the display of the program number. The last instruction of sub-program 27 is a calling instruction for the first instruction of sub-program 22. The last instruction of sub-program 23 is a conditional call instruction of the first instruction of sub-program 25 or of the first instruction of sub-program 24 for testing the position of switch t6. The last instruction of sub-program 24 is a conditional call instruction for the first instruction of sub-program 22 or for the first instruction of sub-program 28 for starting the selected program. This sub-program 28 contains instructions for testing the number of the displayed program and for the connection to the first instruction of the program corresponding to the displayed-number.

When the integrated circuit 1 is energized, the instruction address register 3 sets itself at the address of the first instruction of the selection program 20, i.e. at the first instruction of the initial sub-program 21.

This sub-program 21, by means of the instruction decoder 4 and the arithmetic and logic unit 5, resets the RAM memory 8 to zero and initials the number of steps to 99, this number of steps being memorised in the RAM part 8 of memory 2. Then, sub-program 22 carries out the test of the number of the memorised step, which test is positive because the number of steps is 99. The sub-program 25 increments the number of the program which is memorised in the RAM part 8 of memory 2. This program number thus passes from 0 to 1; at the same time, this number is displayed on the display device AP. Sub-program 26 places the number of steps to zero in the corresponding RAM part 8. Then, sub-program 27 introduces a time delay for example of 2 seconds, before calling sub-program 22. This time delay is obtained by a sequence of instructions contained in sub-program 27 which counts, by the RAM memory 8, the pulses coming from input K8 of the circuit, until a certain number of pulses corresponding to the desired time delay is reached.

Sub-program 22 then once more carries out the test for the number of the steps, which test is hence negative, and calls sub-program 23 for testing the position of switch t3. This test of the position of switch t3 is carried out by means of the first instruction of sub-program 23, which positions the output S0 at the logic level 1, the logic level 0 being the rest level, and by means of a sequence of instructions of the same sub-program 23 which tests the state of input K1.

If the switch t3 is then manually actuated to the closed position, a contact is made between the output S0 and the input K1 which passes to the logic level 1. The sub-program 23 detects the logic level 1 of input K1 and calls the sub-program 25 to increment and display the number, 2, of the program via the output network 6 and the display device AP. The display takes place by supplying the segments A1, A2, A7, A5 and A4 by the corresponding outputs R1, R2, R7, R5 and R4 and output S2 of the integrated circuit 1. As long as the switch t3 is in the closed position, the sub-programs 22, 23, 25, 26 and 27 form a closed loop and the number of the program increments every 2 seconds.

When the number of the sought program is displayed, it suffices to open the switch t3 so that sub-program 23 calls sub-program 24 which carries out the test for the position of switch t6. In the normal rest position, with switch t6 open, sub-program 24 calls sub-program 22. A closed loop is formed by the sub-programs 22, 23 and 24 and the number of the chosen program remains displayed.

When the operator desires to start the program corresponding to the displayed number, he manually closes switch t6. Sub-program 24 thus calls sub-program 28 which, as a function of the displayed number of the program, calls the corresponding program which is carried out.

During carrying out of the selected program, the display device AC symbolically indicates the cycle being carried out; for example, when the programmer is used in a washing machine, it indicates, pre-washing, washing, rinsing, spindrying and so on. The switches t1, t2, t4, t5, t7, t8 and t9 thus for example correspond to elements for controlling the temperature and the water level of the washing machine, and enable the selected program to test the state of the machine, e.g. its temperature and the water level. The tests of the position of switches t1, t2, t4, t5, t7, t8 and t9 are carried out in a similar manner to the test of the position of the switch t3, as previously described. For example, the test of the position of switch t4 is carried out by placing output S2 at the logic level 1, and by using a sequence of instructions of programs selected from P1 to P8, which tests the state of the input K2.

The network of interfaces 12 enables the outputs S3 to S11 of the integrated circuit 1, which generally have low input current, to control the members of the machine. These interfaces may be transistors, relays, triacs and so on.

Instead of being carried out by means of a manual switch t6, starting of the selected program could be automatic, for example after a time delay.

Also the single integrated circuit in the described embodiment could be replaced by several integrated circuits each forming a part of the described circuit.

An electronic programmer according to the invention is useful when it is necessary to select any one of a large number of programs while using a simple device requiring a relatively reduced cabling. Particularly interesting applications are the control of clothes and dish washing machines.

What is claimed is:

1. An electronic programmer having automatic program selection, comprising:
memory means for storing a plurality of instruction programs; selecting means responsive to an input signal for automatically successively selecting respective ones of the stored instruction programs during the duration of the input signal; first switching means for applying an input signal to said selecting means to implement successive selection of the stored programs; read-out means responsive to an input signal and cooperative with said memory means and said selecting means for reading out the instructions comprising a selected program; second switching means for applying an input signal to said read-out means to implement read-out of the selected program; and display means cooperative with said selecting means and said read-out means for displaying which programs are successively selected during program selection and for continually displaying which of the plurality of programs has been selected after program selection has been completed and for displaying which of the program instructions is being read out.

2. An electronic programmer according to claim 1, wherein said memory means, said selecting means and said read-out means comprise a single integrated circuit.

3. An electronic programmer according to claim 1, wherein said first switching means includes a single manually operable switch operable for applying an input signal to said selecting means.

4. An electronic programmer according to claim 1, wherein said second switching means includes a single manually operable switch operable for applying an input signal to said read-out means.

* * * * *